United States Patent
Skillman et al.

(10) Patent No.: US 9,665,494 B2
(45) Date of Patent: May 30, 2017

(54) PARALLEL LOOKUP IN FIRST AND SECOND VALUE STORES

(71) Applicant: ARM LIMITED, Cambridge (GB)

(72) Inventors: Allan John Skillman, Cambridge (GB); Chiloda Ashan Senerath Pathirane, Cambridge (GB)

(73) Assignee: ARM Limited, Cambridge (GB)

( * ) Notice: Subject to any disclaimer, the term of this patent is extended or adjusted under 35 U.S.C. 154(b) by 86 days.

(21) Appl. No.: 14/709,784

(22) Filed: May 12, 2015

(65) Prior Publication Data

US 2015/0363321 A1 Dec. 17, 2015

(30) Foreign Application Priority Data

Jun. 11, 2014 (GB) .................................. 1410372.5

(51) Int. Cl.
| | | |
|---|---|---|
| G06F 12/08 | (2016.01) | |
| G06F 12/0884 | (2016.01) | |
| G06F 12/0846 | (2016.01) | |
| G06F 12/0864 | (2016.01) | |
| G06F 12/0895 | (2016.01) | |
| G06F 12/121 | (2016.01) | |

(52) U.S. Cl.
CPC ...... *G06F 12/0884* (2013.01); *G06F 12/0846* (2013.01); *G06F 12/0864* (2013.01); *G06F 12/0895* (2013.01); *G06F 12/121* (2013.01); *G06F 2212/1028* (2013.01); *G06F 2212/604* (2013.01)

(58) Field of Classification Search
CPC . G06G 12/08; G06F 12/0884; G06F 12/0846; G06F 2212/604; G06F 2212/1028; G06F 12/0895; G06F 12/121; G06F 12/0864
USPC .......................................... 711/108, 103, 120
See application file for complete search history.

(56) References Cited

U.S. PATENT DOCUMENTS

| | | | |
|---|---|---|---|
| 4,942,518 A | 7/1990 | Weatherford et al. | |
| 6,427,191 B1 | 7/2002 | Fu et al. | |
| 8,464,145 B2 * | 6/2013 | Grivna | G06F 11/1016 714/801 |
| 8,825,955 B2 * | 9/2014 | Sleiman | G06F 12/0844 711/118 |
| 9,304,908 B1 * | 4/2016 | Karamcheti | G06F 12/121 |
| 9,361,955 B2 * | 6/2016 | Muralimanohar | G11C 5/04 |
| 2008/0034356 A1 * | 2/2008 | Gschwind | G06F 8/445 717/149 |
| 2008/0209129 A1 | 8/2008 | Van De Waerdt et al. | |
| 2013/0007358 A1 | 1/2013 | Hu et al. | |

(Continued)

OTHER PUBLICATIONS

Search Report for GB 1410372.5 dated Dec. 10, 2014, four pages.

(Continued)

*Primary Examiner* — Pierre-Michel Bataille
(74) *Attorney, Agent, or Firm* — Nixon & Vanderhye P.C.

(57) ABSTRACT

A data processing apparatus includes a cache memory supporting parallel data loads involving both a first address and a second address. The first address is compared with TAG values stored within a first value store and the second address is compared in parallel with TAG values stored within a second value store. The second value store contains a proper subset of the data value stored within the first value store.

21 Claims, 4 Drawing Sheets

(56) References Cited

U.S. PATENT DOCUMENTS

2014/0032845 A1 1/2014 Avudaiyappan et al.

OTHER PUBLICATIONS

Niar et al., "Comparing Multiported Cache Schemes", 2003, seven pages.
Juan et al., "Data Caches for Superscalar Processors", *ICS'97*, 1997, pp. 60-67.
Sahuquillo et al., "Exploring the performance of split data cache schemes on superscalar processors and symmetric multiprocessors", *Journal of Systems Architecture*, vol. 51, Aug. 2005, pp. 451-469.
Wilson et al., "Increasing Cache Port Efficiency for Dynamic Superscalar Microprocessors", *ISCA*, May 1996, eleven pages.

\* cited by examiner

PARALLEL LOOKUP IN FIRST AND SECOND VALUE STORES

BACKGROUND

This application claims priority to GB Patent Application No. 1410372.5 filed 11 Jun. 2014, the entire content of which is hereby incorporated by reference.

This disclosure relates to the field of data processing systems. More particularly, this disclosure relates to the field of value lookup within data processing systems.

It is known to provide data processing systems with a wide variety of different forms of data storage mechanisms. These mechanisms may include various levels of cache memory, multiple main memories, coherent memory systems and the like. In some data processing systems it is desirable to be able to perform multiple data access operations in parallel. A problem with this type of arrangement is that if the data being accessed is stored within a single data structure, then this data structure needs to provide multiple access ports. There are complexity, robustness, cost and power overheads associated with providing memories with multiple access ports. An alternative approach is to duplicate the memory such that each memory may have a single access port. However, this approach increases circuit area, cost and power consumption.

SUMMARY

Viewed from one aspect the present disclosure provides an apparatus for processing data comprising:
a target value generator configured to generate in parallel a plurality of target values;
a first value store having X storage locations configured to store respective ones of a plurality of first stored values, where X is a positive integer;
a second value store having Y storage locations configured to store respective ones of a plurality of second stored values, wherein Y is a positive integer and X is greater than Y;
first comparison circuitry coupled to said first value store and configured to compare a first of said plurality of target values with one or more of said plurality of first stored values stored in said first value store; and
second comparison circuitry coupled to said second value store and configured to compare a second of said plurality of target values with one or more of said plurality of second stored values stored in said second value store in parallel with said first comparison circuitry comparing said first of said plurality of target values with one or more of said plurality of first stored values stored in said first value store;
wherein, when said first value store stores greater than Y first values, said plurality of second stored values are a proper subset of said plurality of first stored values.

The present technique recognises that multiple value stores may be provided into which parallel access operations may be made without the different stores necessarily having to have the same size. The second value store may be smaller than the first value store and yet a large proportion of the desired accesses may hit within the second value store. Thus, parallel accesses may be supported without the cost of fully duplicating the value stores.

One operational factor in the use of the present techniques is an appropriate choice of allocation algorithm to be applied by maintenance circuitry coupled to the first value store and the second value store. The allocation algorithm may vary depending on the particular implementation desired. One useful form of allocation algorithm is that it acts to store a new value to both the first value store and to the second value store when a comparison operation to find the new value in the first value store missed. Thus, if there is a miss in the larger value store (i.e. the first value store), then the value which missed will be filled into both the first value store and the second value store.

Another feature of the allocation algorithm used is that it may act to store a new value to the second value store (i.e. the smaller store) when a comparison operation to find a new value resulted in a hit within the first value store (i.e. larger store) and missed in the second value store. As the second value store stores a proper subset of the values stored within the first value store, a hit within the second value store and a miss within a first value store cannot occur during normal operations. An entry can be valid in the second value store when there is an invalid index in the first value store—this can occur when the second value store contains a valid entry for another (aliased) address in the first value store not related to the original lookup. However, there cannot be a hit in the second store for an address which is not a hit in the primary store.

While it will be appreciated that the first value store and the second value store could have a variety of different forms, such as fully associated stores, in some embodiments the first value store and the second value store are both N way stores. Providing both the first value store and the second value store to have the same number of ways has the advantage of simplifying the tracking of the correlation between where a particular value is stored in one of the value stores compared with where it is stored within the other value stores, e.g. the same value may be stored in the same way in both of the value stores.

The maintenance circuitry may also operate a replacement algorithm to select storage locations into which new values are to be written and from which any existing values are to be evicted. This replacement algorithm may operate so that it preferentially selects to store a new value to storage locations within the first value store and the second value store that both do not contain valid stored values and are in corresponding ways.

While it will be appreciated that the first value store and the second value store may be physically implemented using the same or different technologies and can have a wide variety of different forms, in some embodiments the first value store comprises a random access memory having a first read latency and the second value store comprises a plurality of registers and a second store multiplexer configured to select one or more of the second store values for output, with the second value store in this circumstance having a second read latency that is less then the first read latency.

An apparatus employing the above storage mechanisms may be driven by a clock signal having clock cycles and the first read latency may be such that it extends into a clock cycle following a clock cycle in which the second read latency ends. Having the second read latency end a least a cycle earlier than the first read latency permits the result of the comparison performed in the second value store to be used to control operations in the first value store as soon as the first value store becomes available for use, e.g. after the first read latency ends.

As an example of the above, if the second of the plurality of target values does not hit within the second value storage, then the second of the plurality target values may be supplied to the first comparison circuitry for comparison with one or more of the plurality of first stored values stored in the first value store. Thus, a miss in the second value store which is storing a proper subset of the values stored within the first value store may be followed by a full look up in the first value store to attempt to find a match.

The target value generator may in some embodiments be formed to use a plurality of target value output channels. These may supply the first target value and the second target value. In this context, target value multiplexing circuitry may be coupled to the target value output channels and serve to select one of the target value output channels to serve as a source for the first of a plurality of target values which is to be compared against the first value store (largest store).

While it is appreciated that in some embodiments a similar multiplexing arrangement may be applied to select the second of the plurality of target values from among the plurality of target value output channels, the path to the second value store may be increased in speed if such multiplexing is avoided and the second value store is coupled to a fixed one of the plurality of target value output channels.

While the above has described the present techniques in the context of value storage in general, such as storage of hash values against which a comparison is to be made, the present techniques may be used in some embodiments in which the first value store is a first cache TAG memory and the second value store is a second cache TAG memory. Providing a cache memory that supports parallel access operations is advantageous from a performance point of view (e.g. by allowing more instructions to execution in parallel) and the present techniques permit such behaviour without requiring the use of dual port memories and without full duplication of the cache TAG memories.

In this context, the cache memory may comprise a first cache data memory and second cache data memory such that a TAG hit within the first cache TAG and a TAG hit within a second cache TAG memory permit both the first cache data memory and the second cache data memory to be accessed in parallel.

In a system with such an arrangement of multiple cache data memories, these may be arranged such that data values which are cacheable within one of the memories are not cacheable within the other of the memories and vice versa, so as to provide determinism as to where a particular data value will be stored within the cache system.

While the present techniques provide support for parallel cache accesses, such as parallel load operations to independent load addresses, the memory structure may also be used to support a single load operation and in this circumstance such a single load operation may be routed to the first value store as this contains the full set of data against which a comparison can be made.

It will be appreciated that the relative sizes of the first value store and the second value store could vary. In at least some use cases, a good balance between performance and size reduction has been achieved when X=16*Y i.e. the first value store is sixteen times larger then the second value store in terms of the number of storage locations it contains.

Viewed from another aspect, the present disclosure provides an apparatus for processing data comprising:
    target value generating means for generating in parallel a plurality of target values;
    first value storage means, having X storage locations, for storing respective ones of a plurality of first stored values, where X is a positive integer;
    second value storage means, having Y storage locations, for storing respective ones of a plurality of second stored values, wherein Y is a positive integer and X is greater than Y;
    first comparison means, coupled to said first value storage means, for comparing a first of said plurality of target values with one or more of said plurality of first stored values stored in said first value storage means; and
    second comparison means, coupled to said second value storage means, for comparing a second of said plurality of target values with one or more of said plurality of second stored values stored in said second value storage means in parallel with said first comparison means comparing said first of said plurality of target values with one or more of said plurality of first stored values stored in said first value storage means;
    wherein, when said first value storage means stores greater than Y first values, said plurality of second stored values are a proper subset of said plurality of first stored values.

Viewed from a further aspect, the present disclosure provides a method of processing data comprising the steps of:
    generating in parallel a plurality of target values;
    storing in a first value store respective ones of a plurality of first stored values, where X is a positive integer;
    storing in a second value store respective ones of a plurality of second stored values, wherein Y is a positive integer and X is greater than Y;
    comparing a first of said plurality of target values with one or more of said plurality of first stored values stored in said first value store; and comparing a second of said plurality of target values with one or more of said plurality of second stored values stored in said second value store in parallel with said step of comparing said first of said plurality of target values with one or more of said plurality of first stored values stored in said first value store;
    wherein, when said first value store stores greater than Y first values, said plurality of second stored values are a proper subset of said plurality of first stored values.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
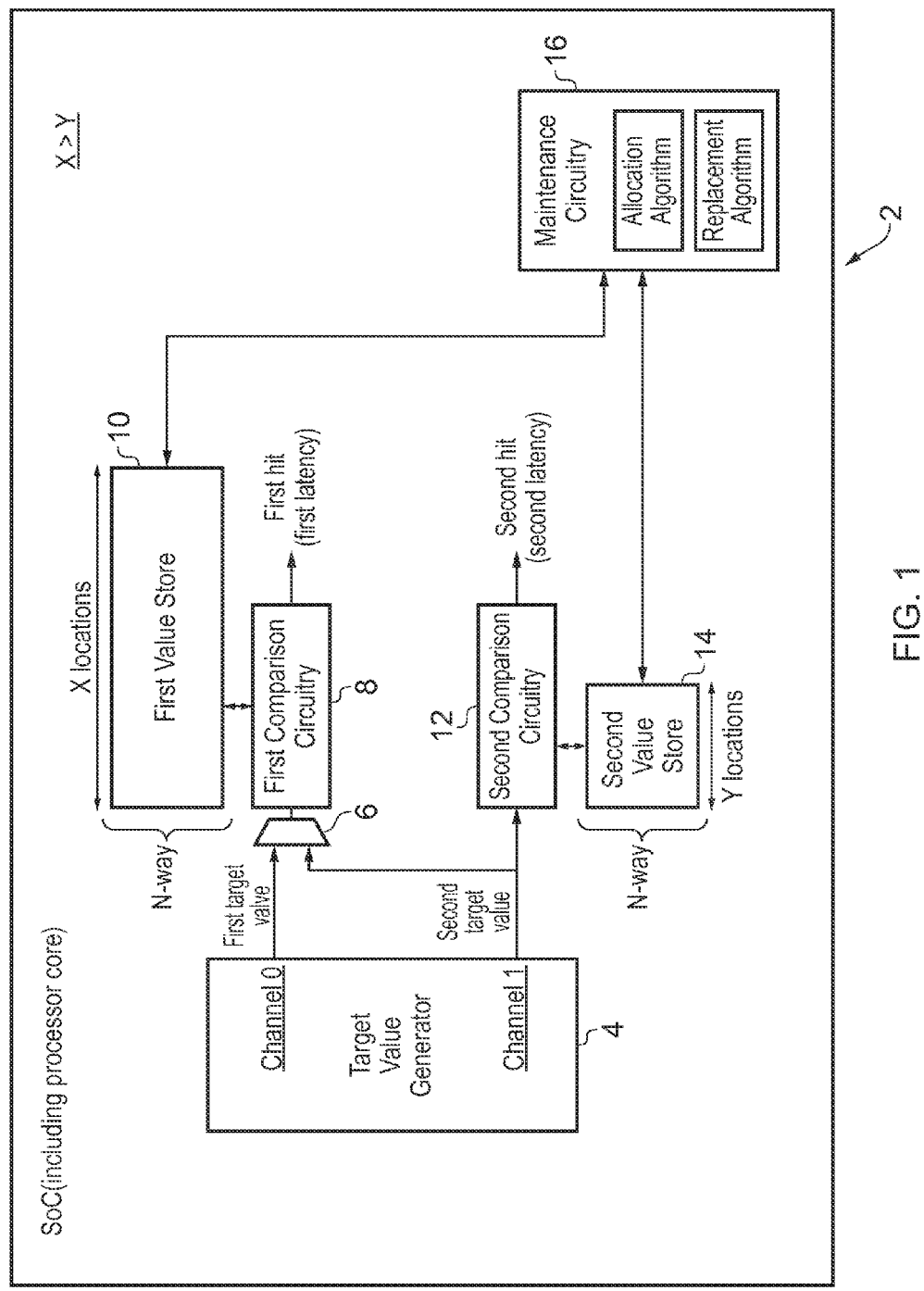
FIG. 1 schematically illustrates a memory system for supporting parallel data accesses with an apparatus for processing data.

FIG. 1 schematically illustrates an apparatus 2 for processing data which includes a mechanism for supporting parallel data accesses. It will be appreciated that the apparatus 2 will typically comprise many additional circuit elements and that these have been omitted from FIG. 1 for the sake of clarity and in order to concentrate upon the data access mechanisms. For example, the apparatus 2 may comprise a processor core for executing program instructions including mechanisms for performing arithmetic and logical operations, interface circuitry and other circuitry in addition to the data access mechanisms illustrated in FIG. 1.

The data access mechanisms of FIG. 1 include a target value generator 4 which generates in parallel a first target value on channel 0 and a second target value on channel 1. The first target and the second target value may be memory addresses within a memory address space, but it is possible that other forms of target value may be generated, such as, for example, hash values it is desired to look up within a collection of stored hash values.

The first target value is supplied via a target value multiplexer 6 to first comparison circuitry 8. The first comparison circuitry 8 serves to compare the first target value with one or more first values stored within a first value store 10. It will be appreciated that the first value store 10 could be configured in a variety of different manners, such as a fully associated memory. However, in the example illustrated, the first value store has N ways and accordingly the first target value is compared against N first values stored at corresponding index locations within respective ways of the first values store 10. If a match is found, then the first comparison circuitry produces a first hit signal (which can be a hit for either channel 0 or channel 1 due to the multiplexing).

The second target value is supplied directly to second comparison circuitry 12 where it is compared against one or more second values stored within the second value store 14. The second value store 14 again comprises an N way value store. The second comparison circuitry produces 12 a second hit signal if a match is detected.

The second value store has Y storage locations. The first value store has X storage locations. The first value store 10 has a larger number of storage locations than the second value store 14 and accordingly X>Y.

The physical form of the first value store 10 and the second value store 14 may be the same or may be different. As an example, the first value store 10 may be formed as a random access memory whereas the second value store 14 may have the form of registers (e.g. an array of flip-flop (latches) in a circuit) and appropriate multiplexers. In such an arrangement, the first value store 10 may have a higher storage density in terms of area whereas the second value store 14 may have a lower access latency. In this example embodiment, the first comparison circuitry 8 produces the first hit signal hit 0 with a first access latency and the second comparison circuitry 12 produces the second hit signal hit 1 with a second access latency. The first access latency is greater than the second access latency.

The first target value and the second target value are provided in parallel starting at substantially the same time and accordingly the access to the first value store 10 will be completed later than the access to the second value store 14. In some embodiments the access to the second value store 14 may complete one or more processing cycles earlier than the access to the first value store 10. This can permit the second target value to the re-routed to the first value store 10 if a miss has occurred in the second value store 14 in order to check whether or not the first value store 10, which includes more data, will yield a hit. The second value store 14 stores a proper subset of the data values stored within the first value store 10. All values stored within the second value store 14 are also present within the first value store 10. Maintenance circuitry 16 coupled to both the first value store 10 and the second value store 14 serves to apply an allocation algorithm and a replacement algorithm to maintain this proper subset relationship.

Figure 2:
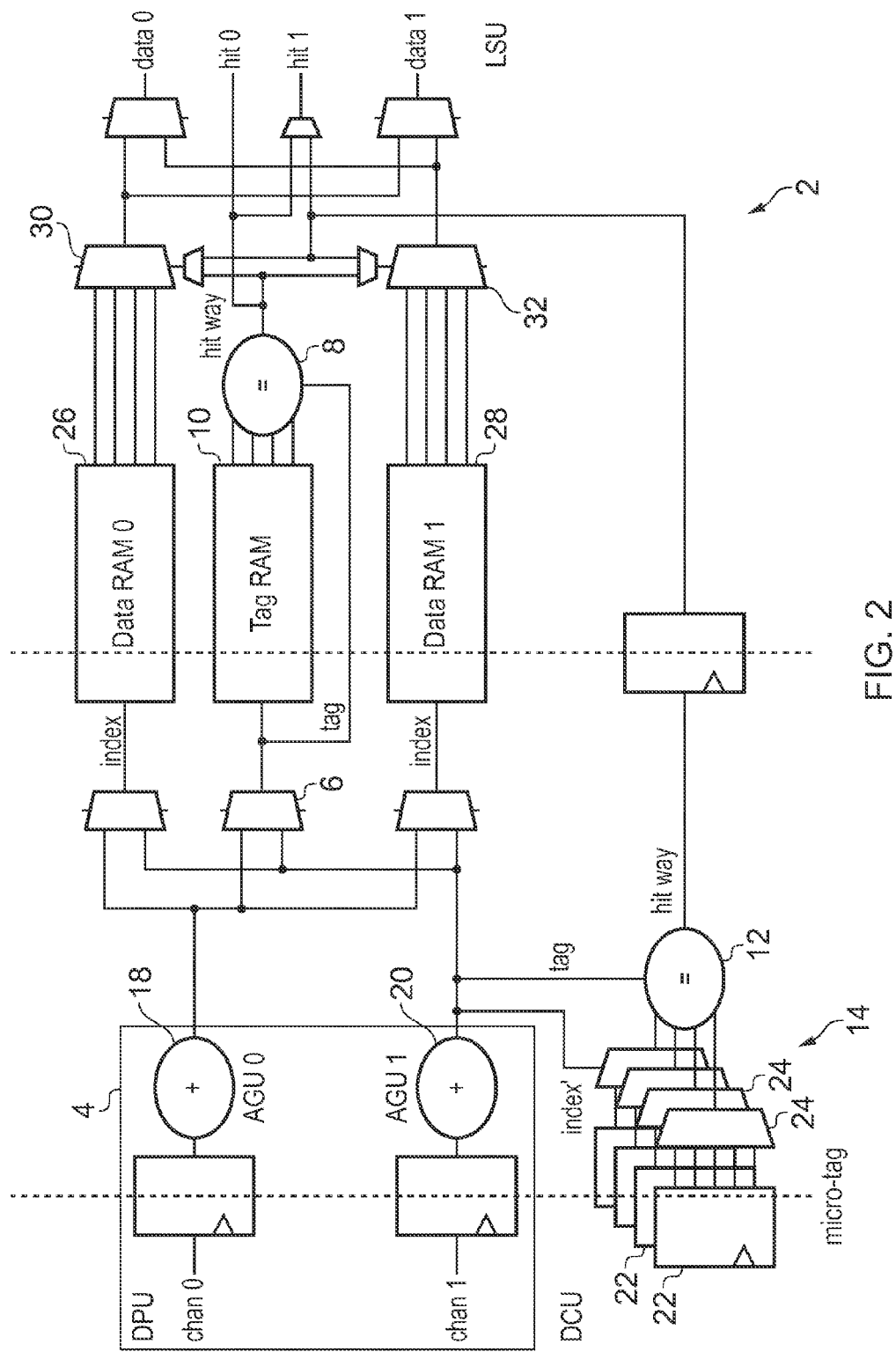
FIG. 2 is a diagram schematically illustrating a cache memory for supporting parallel load operations.

FIG. 2 illustrates a more specific example of a data storage mechanism of the type described generally in the relation to FIG. 1. The illustrated circuitry forms part of and/or interfaces with a data processing unit (DPU), a data cache unit (DCU) and a load store unit (LSU). In this example embodiment, the data storage mechanism is a cache memory supporting two parallel data load operations. In this example, the target value generator 4 serves to generate two target addresses via respective address generation units 18, 20. The target address from a first address unit 18 is supplied via a multiplexer 6 to a TAG RAM 10 which serves as the first value store. A second address from a second address generation unit 20 is supplied to the TAG RAM 10 via the multiplexer 6 and also directly to a micro-tag 14, which serves as the second value store. The micro-tag 14 is composed of four ways of register banks 22 between which associated multiplexers 24 select second values stored within the registers 22 for comparison with the second address value using the second comparator 12. The registers 22 and the multiplexers 24 are rapid in their operation and so the hit value from the second value store 14 is generated with a low latency such that it is available before the end of the same clock cycle in which the second address value is generated.

The first value store 10 is in the form of a RAM and while this is more dense in the storage it provides, it operates more slowly and so the result of the comparison of the address value supplied on the multiplexer 6 into the TAG RAM 10 is not available until a later clock cycle.

If a tag match/hit occurs in either the TAG RAM 10 or the micro-tag 14, then this generates a hit signal indicating both that a hit has occurred and identifying the respective way within the appropriate one of two data RAMs 26, 28 which is storing the corresponding data values for that memory address. The signals identifying the way in which the hit has occurred are used to control output multiplexers 30, 32 to select the associated data value to be supplied to the output upon either output channel data 0 or output channel data 1. The memory address space is divided between the two data RAMs 26, 28 such that 32-bit words for which the memory address bit [2] is "0" are stored within data RAM 26 whereas 32-bit words for which the memory address bit [2] is "1" are stored within the data RAM 28. The TAG RAM 10 stores TAG values for all the data values stored within the data RAMS 26, 28. The micro-tag 14 stores a proper subset of the TAG values for the data values stored within the data RAMS 26, 28.

In practice with real life work loads it is found that a large proportion of times when parallel load operations are required, the second address will hit within the micro-tag 14 even though this contains relatively few entries. The allocation and replacement algorithms to be described later facilitate this outcome by populating the micro-tag 14 with tag values which are statistically likely to be required.

As previously mentioned, the maintenance circuitry 16 applies both an allocation algorithm and a replacement algorithm for controlling which tag entries are stored within the micro-tag 14 and the TAG RAM 10.

Figure 3:
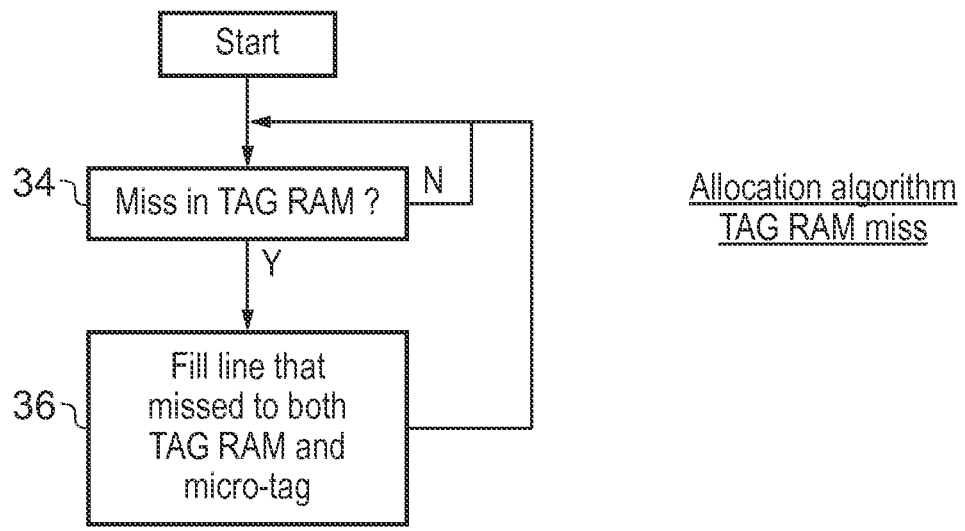
FIG. 3 is a flow diagram schematically illustrating an allocation algorithm associated with a TAG RAM miss.

FIG. 3 is a flow diagram illustrating a portion of the allocation algorithm responsive to a TAG RAM miss. At step 34 a determination is made whether a TAG RAM miss has occurred. If a TAG RAM miss has occurred, then step 36 serves to fill the cache line of data that missed into the cache and also to place the corresponding address tag into both the TAG RAM 10 and the micro-tag 14.

Figure 4:
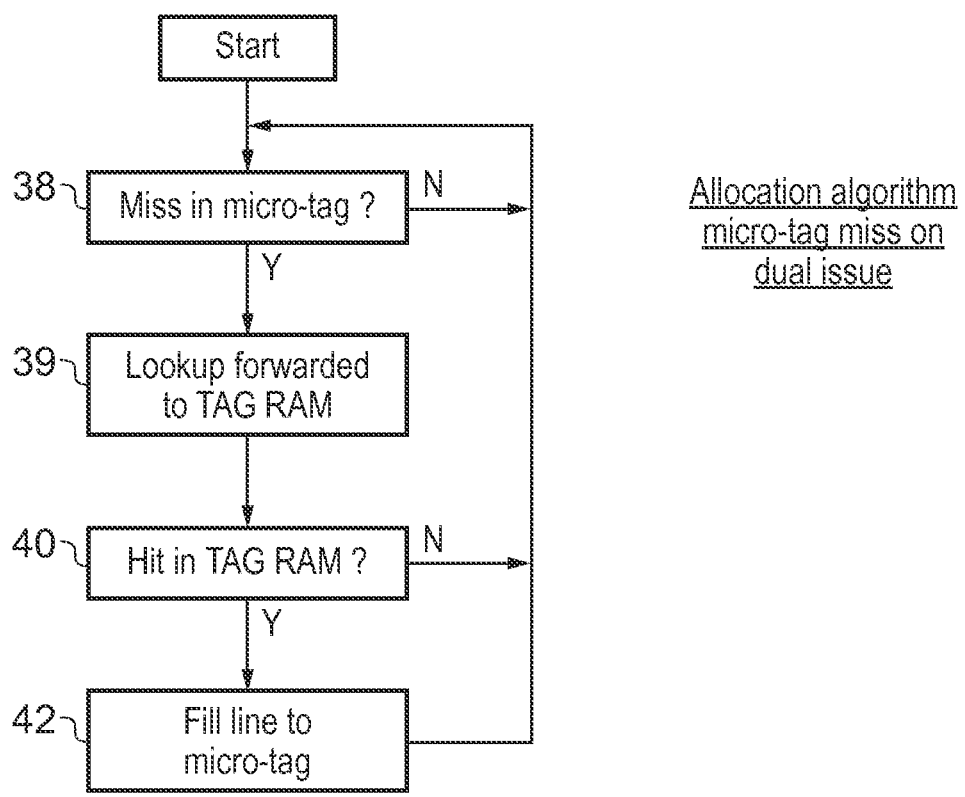
FIG. 4 is a flow diagram schematically illustrating an allocation algorithm associated with a micro-tag miss.

FIG. 4 illustrates a portion of the allocation algorithm performed by the maintenance circuitry 16 during a dual issue on both channel 0 and channel 1. In this portion of the algorithm a micro-tag miss is detected at step 38. When such a micro-tag miss is detected, then the lookup is forwarded to the TAG RAM 10 at step 39 as previously described. If this forwarded lookup generates a hit within the TAG RAM 10, as detected at step 40, then step 42 serves to fill the relevant tag entry into the micro-tag 14. The data will already be present within the data RAMs 26, 28.

In the case of a single issue request on channel 0 the micro-tag 14 may be updated upon a hit in the TAG RAM 10. In the case of single issue requests on channel 1, a lookup may be performed in both the TAG RAM 10 and the micro-tag 14 for the same address. This permits an update of the micro-tag 14 upon a hit in the TAG RAM 10 and a miss in the micro-tag 14. This later option enables lower power operation as the micro-tag 14 is not updated if the address is already present, but including the first option gives better performance overall. In both these cases, the request does not need re-routing to the TAG RAM 10.

The allocation algorithm serves to fill both the TAG RAM 10 and the micro-tag 14 whenever a miss occurs in the TAG RAM 10. Furthermore, the algorithm serves to fill the micro-tag 14 with a tag value taken from the TAG RAM 10 if a hit occurs in the TAG RAM 10 for which a corresponding miss occurred in the micro-tag 14. The combined action of these behaviours of the allocation algorithm results in the micro-tag 14 containing a proper subset of the values stored within a TAG RAM 10. All values present within the micro-tag 14 are also present within the TAG RAM 10.

Figure 5:
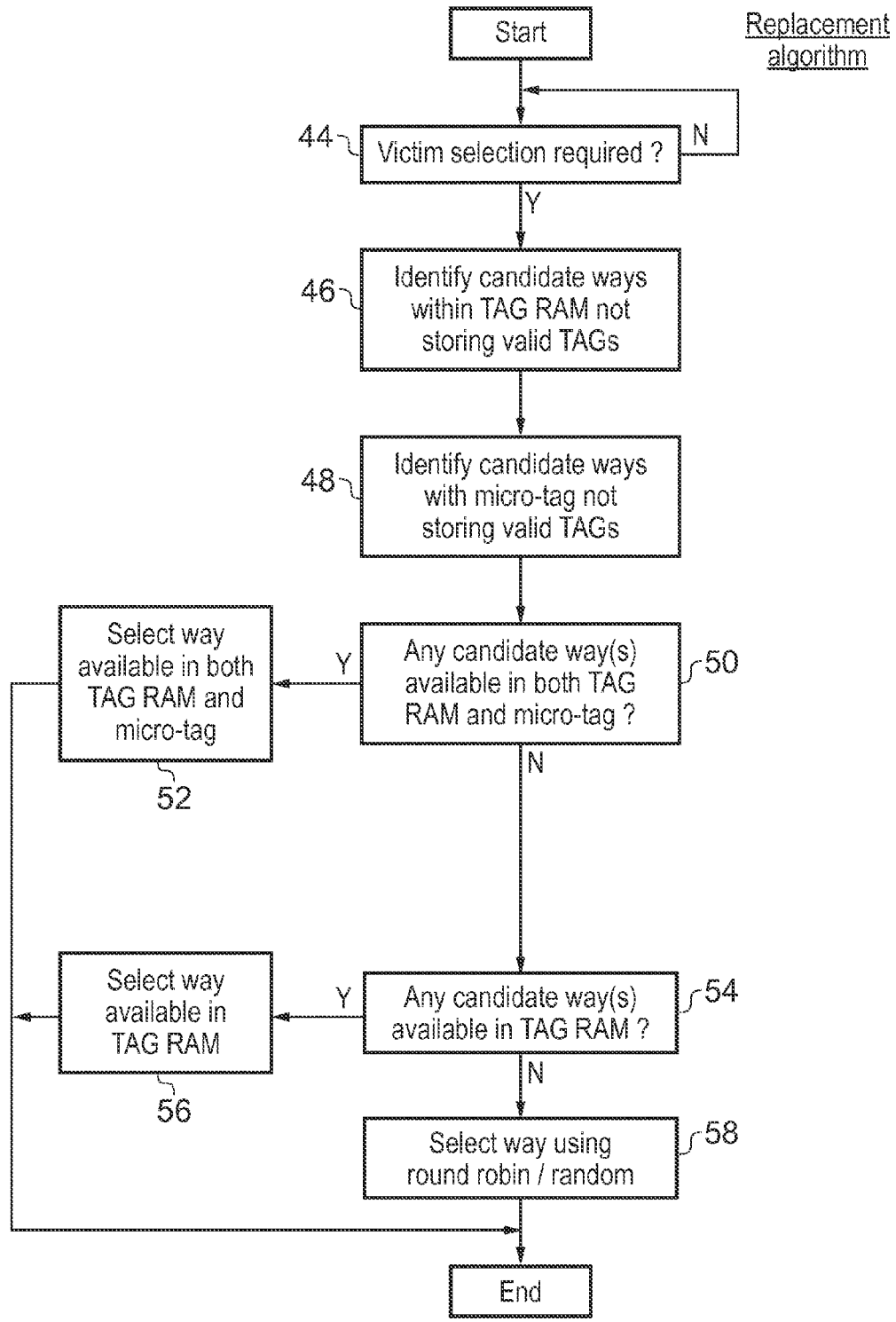
FIG. 5 is a flow diagram schematically illustrating a replacement algorithm.

FIG. 5 schematically illustrates a replacement algorithm which may be employed by the maintenance circuitry 16. At step 44 processing waits until victim selection is required. Step 46 determines candidate ways within the TAG RAM 10 (at the relevant index position) which are not storing valid-tags. Step 48 then determines candidate ways within the micro-tag 14 (at the relevant index position) which are not storing validtags. At step 50 a determination is made as to whether or not there are any candidate ways which are available both in the TAG RAM 10 and the micro-tag 14. If there are such candidate ways available in both locations, then such a way is selected as the victim to be used at step 52.

If the determination at step 50 is that no candidates ways which are available in both the TAG RAM 10 and the micro-tag 14 can be found, then step 54 determines whether or not there are any candidate ways available within the TAG RAM 10. If there are such candidate ways available, then step 56 serves to select one of these available ways in the TAG RAM 10 into which the replacement is made with the corresponding way and index location within the micro-tag also being filled with the new data.

If the determination at step 54 is that there are no candidate ways available in the TAG RAM 10, then step 58 serves to select a way to be used in the TAG RAM 10 (same way also being used in the micro-tag 14) using a conventional victim selection algorithm such as round robin, random, pseudo random, LFSR etc.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:
1. Apparatus for processing data comprising:
a target value generator configured to generate in parallel a plurality of target values;
a first value store having X storage locations configured to store respective ones of a plurality of first stored values, where X is a positive integer;
a second value store having Y storage locations configured to store respective ones of a plurality of second stored values, wherein Y is a positive integer and X is greater than Y;
first comparison circuitry coupled to said first value store and configured to compare a first of said plurality of target values with one or more of said plurality of first stored values stored in said first value store; and
second comparison circuitry coupled to said second value store and configured to compare a second of said plurality of target values with one or more of said plurality of second stored values stored in said second value store in parallel with said first comparison circuitry comparing said first of said plurality of target values with one or more of said plurality of first stored values stored in said first value store;
wherein, when said first value store stores greater than Y first values, said plurality of second stored values are a proper subset of said plurality of first stored values.

2. Apparatus as claimed in claim 1, comprising maintenance circuitry coupled to said first value store and said second value store and configured to maintain said plurality of first stored values and said plurality of second store values in accordance with an allocation algorithm.

3. Apparatus as claimed in claim 2, wherein said allocation algorithm stores a new value to both said first value store and to said second value store when a comparison operation to find said new value in said first value store missed.

4. Apparatus as claimed in claim 3, wherein said allocation algorithm stores said new value to said second value store when a comparison operation to find said new value hit in said first value store and missed in said second value store.

5. Apparatus as claimed in claim 2, wherein said first value store is N-way set associative and comprises N first ways and said second value store is N-way set associative and comprises N second ways, wherein N is a positive integer greater than one.

6. Apparatus as claimed in claim 5, wherein said maintenance circuitry is configured to maintain said plurality of first stored values and said plurality of second store values in accordance with an replacement algorithm that preferentially selects to store new value storage locations within said first value store and said second value store that both do not contain valid stored values and are within corresponding ways.

7. Apparatus as claimed in claim 1, wherein said first value store comprises a random access memory array having a first read latency and said second value store comprises a plurality of registers and a second store multiplexer configured to select one or more of said plurality of second values for output, said second value store having a second read latency that is less than said first read latency.

8. Apparatus as claimed in claim 7, wherein said apparatus is configured to be driven by a clock signal having clock cycles and said first read latency extends into a clock cycle following a clock cycle in which said second read latency ends.

9. Apparatus as claimed in claim 1, wherein if said second of said plurality of target values does not hit within said second value store, then said second of said plurality of target values is supplied to said first comparison circuitry for comparison with said one or more of said plurality of first stored values stored in said first value store.

10. Apparatus as claimed in claim 1, wherein said target value generator comprises a plurality of target value output channels.

11. Apparatus as claimed in claim 10, comprising target value multiplexing circuitry coupled to said plurality of target value output channels and to said first value store and configured to select one of said plurality of target value output channels to serve as a source of said first of said plurality of target values.

12. Apparatus as claimed in claim 11, wherein said second value store is coupled to a fixed one of said plurality of target value output channels.

13. Apparatus as claimed in claim 1, wherein said first value store is a first cache TAG memory and said second value store is a second cache TAG memory.

14. Apparatus as claimed in claim 13, comprising a first cache data memory and a second cache data memory and wherein a TAG hit within said first cache TAG memory and a TAG hit within said second cache TAG memory permits said first cache data memory and said second cache data memory to be accessed in parallel.

15. Apparatus as claimed in claim 14, wherein said first of said plurality of target values corresponds to a memory address of data values cacheable within said first cache data memory and not cacheable within said second cache data memory and said second of said plurality of target values corresponds to a memory address of data values cacheable within said second cache data memory and not cacheable within said first cache data memory.

16. Apparatus as claimed in claim 1, wherein said first value store comprises a single access port memory.

17. Apparatus as claimed in claim 1, wherein said first of said plurality of target values and said second of said plurality of target values correspond to respective independent load addresses of two load operations to be performed in parallel.

18. Apparatus as claimed in claim 17, wherein if a single load operation is performed, then a single load address of said single load operation is routed to said first value store.

19. Apparatus as claimed in claim 1, wherein X=16*Y.

20. Apparatus for processing data comprising:
target value generating means for generating in parallel a plurality of target values;
first value storage means, having X storage locations, for storing respective ones of a plurality of first stored values, where X is a positive integer;
second value storage means, having Y storage locations, for storing respective ones of a plurality of second stored values, wherein Y is a positive integer and X is greater than Y;
first comparison means, coupled to said first value storage means, for comparing a first of said plurality of target values with one or more of said plurality of first stored values stored in said first value storage means; and
second comparison means, coupled to said second value storage means, for comparing a second of said plurality of target values with one or more of said plurality of second stored values stored in said second value storage means in parallel with said first comparison means comparing said first of said plurality of target values with one or more of said plurality of first stored values stored in said first value storage means;
wherein, when said first value storage means stores greater than Y first values, said plurality of second stored values are a proper subset of said plurality of first stored values.

21. A method of processing data comprising the steps of:
generating in parallel a plurality of target values;
storing in a first value store having X storage locations respective ones of a plurality of first stored values, where X is a positive integer;
storing in a second value store having Y storage locations respective ones of a plurality of second stored values, wherein Y is a positive integer and X is greater than Y;
comparing using first comparison circuitry a first of said plurality of target values with one or more of said plurality of first stored values stored in said first value store; and
comparing using second comparison circuitry a second of said plurality of target values with one or more of said plurality of second stored values stored in said second value store in parallel with said first comparison circuitry comparing said first of said plurality of target values with one or more of said plurality of first stored values stored in said first value store;
wherein, when said first value store stores greater than Y first values, said plurality of second stored values are a proper subset of said plurality of first stored values.

* * * * *